United States Patent [19]

Campagnolo

[11] 4,056,172
[45] Nov. 1, 1977

[54] DISK BRAKE

[76] Inventor: Tullio Campagnolo, P.O. Box 822, Vicenza, Italy

[21] Appl. No.: 714,284

[22] Filed: Aug. 13, 1976

[30] Foreign Application Priority Data

Aug. 14, 1975 Italy .................................. 26358/75

[51] Int. Cl.² ........................................... F16D 55/02
[52] U.S. Cl. .................................... 188/26; 188/71.1;
188/71.6; 188/73.2; 188/264 A; 192/70.12;
192/70.15; 192/113 A; 301/6 E
[58] Field of Search .... 188/264 A, 264 AA, 218 XL,
188/71.6, 73.2, 26, 71.1; 192/70.12, 70.15, 113
A, 107 R, 107 C; 301/6 E

[56] References Cited
U.S. PATENT DOCUMENTS

| 2,038,608 | 4/1936 | Sauzedde | 188/264 AA X |
| 2,059,935 | 11/1936 | Eason | 192/70.15 X |
| 2,255,024 | 9/1941 | Eksergian | 188/218 XL |
| 2,655,236 | 10/1953 | Bachman | 188/71.6 X |
| 2,955,681 | 11/1960 | Burnett | 188/264 AA X |
| 3,198,295 | 8/1965 | Fangman et al. | 188/218 XL X |
| 3,982,610 | 9/1976 | Campagnolo | 192/70.15 X |

FOREIGN PATENT DOCUMENTS

236,410 11/1961 Australia ........................ 188/218 XL

*Primary Examiner*—George E. A. Halvosa
*Attorney, Agent, or Firm*—Young & Thompson

[57] ABSTRACT

In a disk brake for motorcycles, the brake disk connects the actual hub of the wheel with the spokes-carrying flanged body of the wheel itself, and the braking member consists of a non-rotating plate, provided with friction pads slidable along the wheel axis. The disk braking surface is a conical surface, with its axis coinciding with the wheel axis, and the friction pads are borne by the plate in such a way as to lie on a conical surface mating with the disk braking surface. The brake plate is widely slotted, so as to provide a unit comprising a hub, three spokes and two peripheral crowns, this unit being obtained by metal casting, the friction pads being applied to the spokes between one crown and the other.

2 Claims, 2 Drawing Figures

DISK BRAKE

BACKGROUND OF THE INVENTION

In my U.S. Pat. No. 3,982,610, I disclosed a disk brake for wheels of ground or air vehicles and especially of motorcycles, of the type in which at least one brake disk connects the actual hub of the wheel with the spokes carrying flange of the wheel itself, and in which at least one non-rotating plate, provided with friction pads, is slidable along the wheel axis in order to establish or remove the braking engagement between said friction pads and said disk, under the opposing action of fluid pressure control means and of spring return means, said disk brake being characterized in that the braking surface of the disk is a conical surface, with the axis coinciding with the wheel axis, and that the friction pads are carried by the plate, so as to lie on a conical surface mating with the disk braking surface, with which they are designed to be engaged.

SUMMARY OF THE INVENTION

After experimental tests carried out with this brake, the Applicant has planned some structural changes, to improve the performance and constructional characteristics thereof.

Such changes essentially concern the brake plate and they form the object of the present invention.

In substance, it has been provided to rationalize the form of the brake plate and the arrangement and configuration of the friction pads carried thereby.

The present invention provides in fact for a brake, like the one heretoforedescribed of the said patent, wherein the brake plate is widely slotted, so as to provide a unit comprising a hub, three spokes and two peripheral crowns, said unit being obtained by metal casting, the friction pads being applied to said spokes between one crown and the other.

Further according to the invention, said friction pads are moreover transected by at least one radial notching and they preferably extend in the radial sense, rather than in the circumferential sense, while the wide slottings of the plate, provided between the two crowns and between the inner crown and the hub, are preferably screened by a protective wire netting.

BRIEF DESCRIPTION OF THE DRAWINGS

The invention will now be described in further detail, by mere way of example, with reference to the accompanying drawings, in which.

DESCRIPTION OF THE PREFERRED EMBODIMENT

Figure 1:
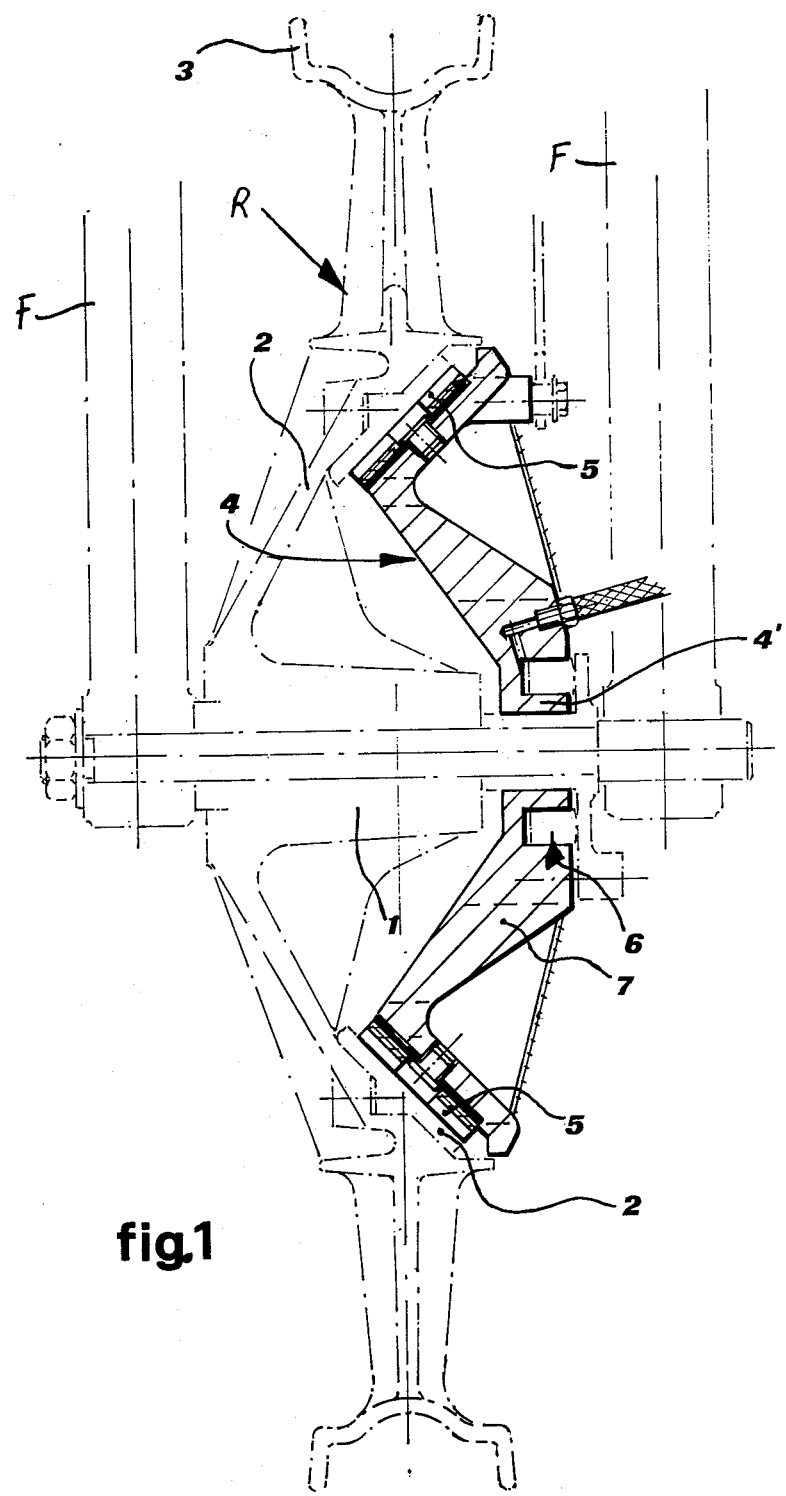
FIG. 1 is a schematic axial section of the brake according to the invention, wherein the brake plate is shown in full lines, while the other parts of the brake are drawn in dashed lines.

The brake of FIG. 1 — shown applied to the wheel R of a motorcycle, of which can be seen the fork F — comprises, as known from the already cited U.S. patent, a hub body 1 carrying a conical brake disk 2 and being connected to the wheel rim 3. The brake further comprises a brake plate 4, provided with friction pads 5, arranged on a conical surface mating with that of the disk 2, said plate 4 being adapted to move axially when fluid pressure operates a cylinder-piston unit 6, embodied in its hub 4'.

Figure 2:
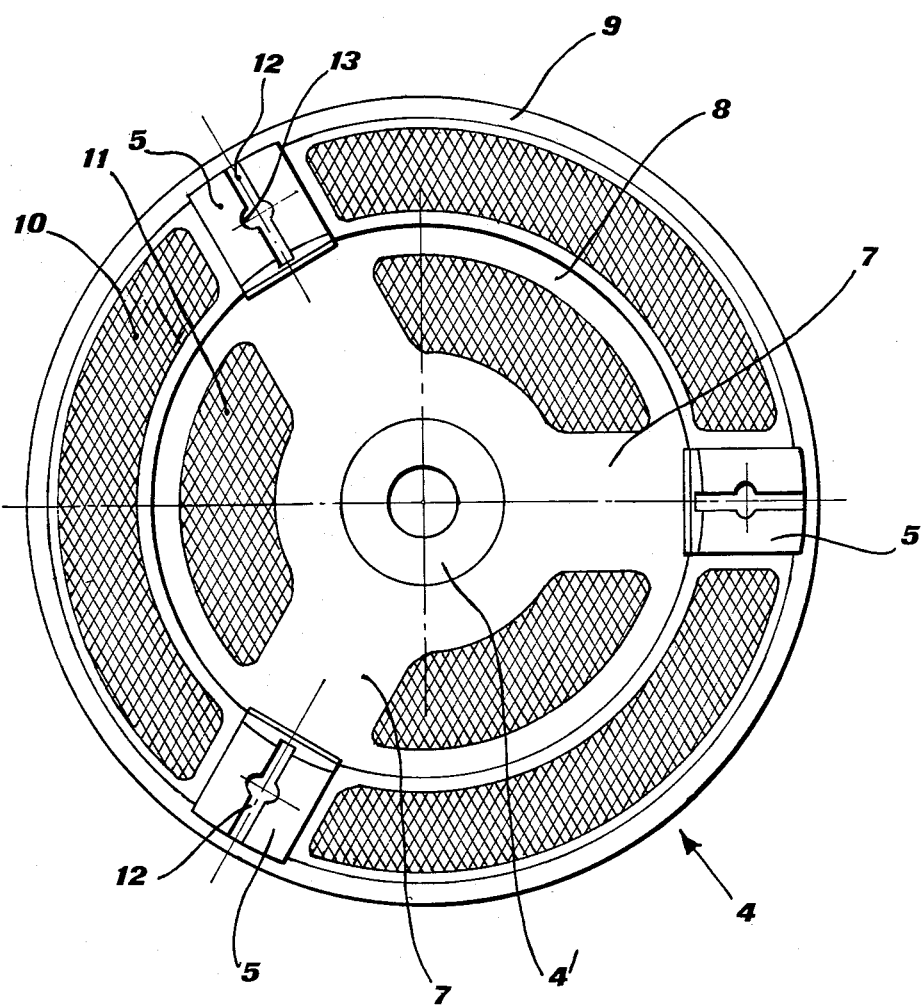
FIG. 2 is an inner front view of the brake plate of the brake of FIG. 1.

According to the invention, the brake plate 4 has been made as a single metal piece obtained by casting and it comprises a hub 4', three spokes 7 radially emerging at a uniform angular spacing from said hub, and two peripheral crowns 8 and 9, coaxial to the hub 4' and connected to the spokes 7. In this way, the plate comprises six very wide slottings between the two crowns 8 and 9 (marked with reference 10) and between the inner crown 8 and the hub 4' (marked with reference 11). Such slottings make the brake plate considerably lighter and allow an efficient air circulation inside the brake, with obvious advantages for the cooling thereof. These slottings may be appropriately screened by protective wire nettings (quite visible in FIG. 2), in order to prevent any foreign bodies from harmfully penetrating into the brake.

The aforedescribed plate 4 comprises three friction pads 5. Such pads extend in a radial direction and they are each applied to one of the spokes 7, between the crown 8 and the crown 9; they comprise a notching 12, which is also radial, with a central enlargement 13.

This arrangement has proved to be the most advantageous in the tests carried out. In particular, the notchings 12 tend to increase the braking edges, improving the scraping possibility of the brake disk, hence eliminating the dust formed by the waste of the friction pads.

Further embodiments of the invention are possible, without departing from the scope of the invention itself: for example, the shape of the friction pads and the number of radial notchings provided therein may vary.

I claim:

1. Disk brake for wheels of ground or air vehicles and especially motorcycles, comprising:
   at least one brake disk connecting the actual hub of the wheel with the spokes-carrying flange of the wheel itself;
   at least one non-rotating plate, provided with friction pads and slidable along the wheel axis in order to establish or remove the braking engagement between said friction pads and said disk, under the opposing action of fluid pressure control means and of spring return means;
   the surface of the brake disk being a conical surface, with its axis coinciding with the wheel axis, and the friction pads being carried by the non-rotating plate in such a way as to lie on a conical surface mating with the conical surface of the disk, with which they are engageable;
   wide slottings in the non-rotating plate, thereby to provide a unit comprising a hub, three spokes and two peripheral crowns, and having the friction pads applied to said spokes between one crown and the other;
   said unit being a metal casting;
   said friction pads being crossed through by at least one radial notching; and
   said slottings being screened by a protective wire netting.

2. Disk brake as claimed in claim 1, said notchings having enlargements therein intermediate their length, and means in said enlargements for securing said friction pads to said spokes.

* * * * *